(12) United States Patent
Li et al.

(10) Patent No.: US 8,923,195 B2
(45) Date of Patent: Dec. 30, 2014

(54) METHOD AND APPARATUS FOR EFFICIENT CONTENT DELIVERY IN RADIO ACCESS NETWORKS

(75) Inventors: Jian Li, Fremont, CA (US); Jim Zhao, Los Altos, CA (US); Wenzhe Zhou, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 151 days.

(21) Appl. No.: 13/425,192

(22) Filed: Mar. 20, 2012

(65) Prior Publication Data

US 2013/0250849 A1 Sep. 26, 2013

(51) Int. Cl.
*H04W 4/00* (2009.01)

(52) U.S. Cl.
USPC ............ 370/328; 370/352; 370/255; 370/349

(58) Field of Classification Search
None
See application file for complete search history.

(56) References Cited

U.S. PATENT DOCUMENTS

| | | | |
|---|---|---|---|
| 8,018,866 B1* | 9/2011 | Kasturi et al. ............... | 370/252 |
| 2002/0138654 A1* | 9/2002 | Liu et al. ..................... | 709/247 |
| 2008/0244126 A1* | 10/2008 | Hundley ...................... | 710/104 |
| 2009/0019262 A1* | 1/2009 | Tashiro et al. ............... | 712/208 |
| 2012/0011271 A1 | 1/2012 | Zhao et al. | |
| 2013/0215748 A1* | 8/2013 | Ratakonda et al. .......... | 370/235 |
| 2013/0219008 A1* | 8/2013 | Zhou et al. .................. | 709/216 |

FOREIGN PATENT DOCUMENTS

| CN | 1756229 A | 4/2006 |
|---|---|---|
| CN | 102377688 A | 3/2012 |

OTHER PUBLICATIONS

Jin, C., et al., "FAST TCP: Motivation, Architecture, Algorithms, Performance," IEEE Infocom 2004, 12 pages.
Mascolo, S., et al., "TCP Westwood: Bandwidth Estimation for Enhanced Transport over Wireless Links," MobiCom '01, Proceedings of the 7th Annual International Conference on Mobil Computing and Networking, Jul. 2001, pp. 287-297.
Muthitacharoen, A., et al., "A Low-bandwidth Network File System," 2001, 14 pages.
Spring, N., et al., "A Protocol-Independent Technique for Eliminating Redundant Network Traffic," SIGCOMM '00, Stockholm Sweden, Jul. 2000, pp. 87-95.
Wang, R., et. al., "TCP With Sender-Side Intelligence to Handle Dynamic, Large, Leaky Pipes," IEEE Journal on Selected Areas in Communications, vol. 23, No. 2, Feb. 2005, pp. 235-248.
Notification of Transmittal of the Internatinal Search Report and the Written Opinion of the International Searching Authority, or the Declaration received on Application No. PCT/CN2013/072952, mailed May 30, 2013, 9 pages.
Lumezanu, Cristian, et al., "The Effect of Packet Loss on Redundancy Elimination in Cellular Wireless Networks," IMC 10, Nov. 1-3, 2010, pp. 294-300.

* cited by examiner

*Primary Examiner* — David Oveissi
(74) *Attorney, Agent, or Firm* — Slater & Matsil, L.L.P.

(57) ABSTRACT

Various methods and communications devices to improve bandwidth utilization in a wireless communication network are provided. By way of example, efficient content delivery in a radio access network is achieved by using an accelerator module configured to implement a stack having, among others, a hypertext transfer protocol (HTTP) layer, a transmission control protocol (TCP) layer, and a de-duplication, Lempel-Ziv (LZ) compression/decompression, and caching layer.

20 Claims, 6 Drawing Sheets

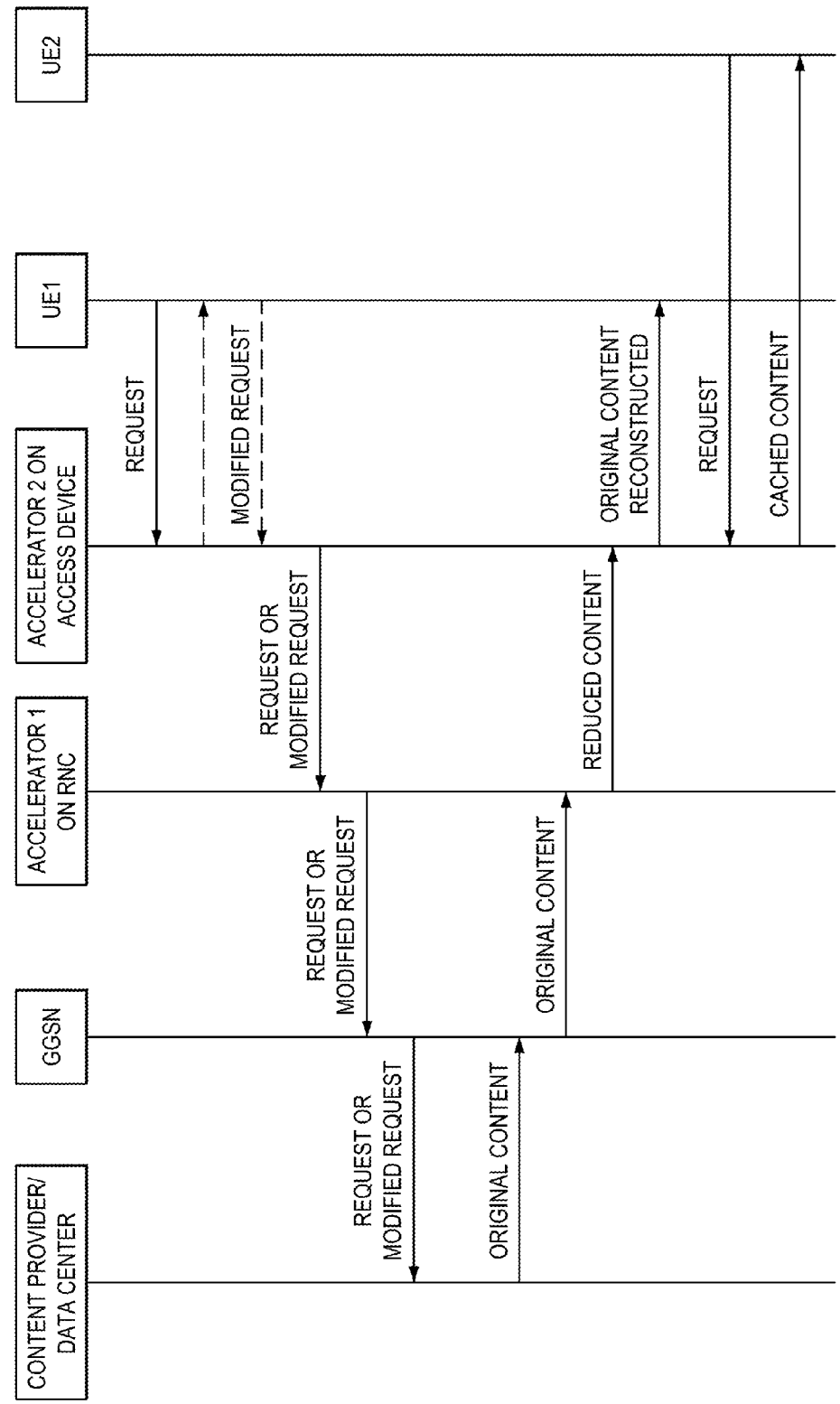

METHOD AND APPARATUS FOR EFFICIENT CONTENT DELIVERY IN RADIO ACCESS NETWORKS

TECHNICAL FIELD

The present disclosure relates generally to a system and method for digital communications, and more particularly to a system and method for content and application acceleration in a cellular wireless communications network.

BACKGROUND

As mobile communications devices, also commonly referred to as User Equipment (UE), mobile stations, terminals, smart phones, and so forth, become more technologically advanced they are becoming capable of providing more than just voice connectivity. In addition to providing voice connections, the technologically advanced mobile communications devices may enable users to web surf, stream multimedia, share images, serve as access points for computers, and so forth, at continually increasing data rates.

The world-wide market penetration of advanced mobile communications devices continues to increase. Furthermore, data (e.g., web-data, multimedia, images, computer data, and so on) may also continue to increase every year. As an example, mobile Internet has become a common platform to allow users to share information and content using advanced mobile communications devices. Streaming video applications, based on hyper-text transfer protocol (HTTP)/transmission control protocol (TCP), are becoming a dominant traffic pattern in mobile Internet. However, these applications may consume a considerable amount of bandwidth.

Therefore, deployment of such large numbers of the advanced mobile communications devices may place a huge burden on bandwidth capabilities of wireless communications networks, which must continue to increase bandwidth capabilities to ensure adequate performance to satisfy user demands. On one hand, this has become costly for the mobile Internet providers and has greatly eroded their bottom line. On the other hand, mobile users have experienced significantly greater latency to access Internet content via cellular wireless connections.

SUMMARY OF THE DISCLOSURE

Technical advantages are generally achieved by embodiments of the present disclosure which provide a system and method for content and application acceleration in a cellular wireless communications network that also serves data content in addition to voice to end users.

In an embodiment, a method for transmitting data is provided. In the method, packets are received from a content provider. A stack in accelerator module on one side of a radio access network is implemented. The stack is configured to reduce the amount of traffic going through radio access network (RAN) and to reduce the latency for the UEs to receive requested content. The packets are transmitted to a cooperating accelerator module disposed on another side of the radio access network. The cooperating accelerator module includes a corresponding stack that, when implemented, is configured to recover original content from pointers or compressed data in the packets, or to serve the content locally to the UEs, or instruct the client to resend request with updated information in order for get content from content provider directly.

In an embodiment, a method for receiving data is provided. In the method, packets transmitted from one side of a radio access network are received. The packets carry content reduced using a stack in accelerator module. A corresponding stack in a cooperating acceleration module on another side of the radio access network is implemented. The stack reconstructs the original before passing it to another communications device connected via LAN.

In an embodiment, a communications device is provided. The communications device includes a receiver configured to receive packets from a content provider disposed on one side of a radio access network, an accelerator module configured to implement a stack to compress the packets, and a transmitter configured to transmit the packets to a communications device on another side of a radio access network thereby permitting the packets to be decompressed using a cooperating accelerator module with a corresponding stack when received. The communication device deployed on one side of RAN is connected to UE via LAN. A communications device on the other side of the RAN is connected to Internet via the wireless core network.

In an embodiment, a communications device is provided. The communications device includes a receiver configured to receive packets from a network device on one side of a radio access network. The content carried in the packets has been greatly reduced by content de-duplication and Lempel-Ziv (LZ)/deflate compression. The communications device also includes a cooperating accelerator module configured to implement a corresponding stack to recover the original content upon receipt thereof and a transmitter configured to transmit the packets to a communications device on another side of the radio access network.

In an embodiment, the accelerator stack includes an HTTP layer configured to reduce the number of protocol handshaking messages going through the radio access network (RAN) and to reduce the latency for the UE to receive requested content. The HTTP layer may perform meta data caching, 301 redirect caching, authentication caching, object caching, connection pooling, and also provide hints to a de-duplication layer regarding content length and header length in order to improve de-duplication results.

In an embodiment, the accelerator stack includes a transmission control protocol (TCP) layer configured to control the amount of data to be transferred and to manage data retransmit in event of packet loss. The TCP layer also adjusts a data transfer window based on acknowledgement streams (or other parameters). The acknowledgement streams, or ACK streams, may provide an indication of network condition. For example, network congestion may be determined through the time it takes ACK packets to arrive and/or the absence of some ACK packets. The TCP layer may also aggregate TCP sessions between different pairs of UEs and content providers in order to reduce the amount of TCP handshaking needed before actual content is transmitted.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 7 is an illustration of information flow through a cellular wireless network when communications devices having the accelerator modules of FIG. 3 are used.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to a specific context, namely a wireless communications system that supports communications devices with data capability, i.e., third-generation (3G) and fourth-generation (4G) communications devices. The concepts of the present disclosure may also be applied, however, to wireless communications systems that support data capable communications devices in general.

Figure 1:
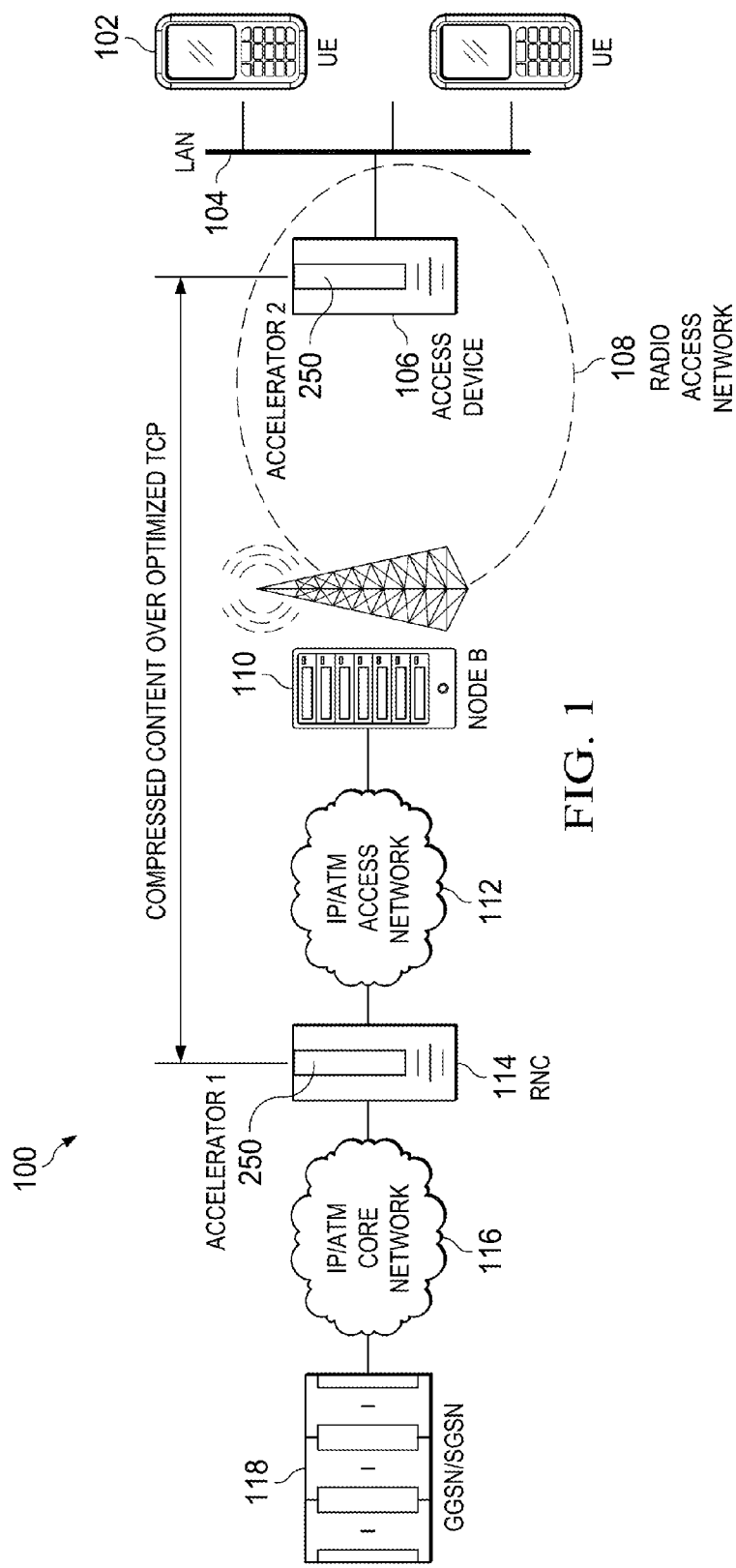
FIG. 1 is a simplified schematic of an embodiment of a universal mobile telecommunications system (UMTS) employing communication devices (e.g., a radio network controller (RNC), an access device, etc.) with an accelerator module in order to improve bandwidth utilization.

FIG. 1 illustrates a high-level view of a cellular wireless communications network 100 such as, for example, a universal mobile telecommunications system (UMTS) for 3G applications. Wireless communications system 100 includes a communications device which is represented in FIG. 1 by user equipment (UE) 102 (e.g., a smart phone, or networked tablet computer). While the communications device is represented by UE 102 in FIG. 1, the communications device may also be another communications device such as, for example, a tablet computer connected to the local area network (LAN).

UE 102 is connected to an access device 106 over LAN (link 104). In an embodiment link 104 is a wireless fidelity (WiFi) connection. Access device 106 may control communications to and from UE 102. As such, access device 106 controls the network access of UE 102. Access device 106 (e.g., a mobile hot spot, etc.), is connected to a Node B (NB) 110 via 3G/4G cellular wireless (link 108). In an embodiment, link 108 represents a radio access network (RAN) existing between access device 106 and NB 110. NB 110 may also be referred to as a base station, a controller, a communications controller, and so forth. NB 110 may serve a number of UEs, depending on a configuration of wireless communications system 100, time of day, and so forth.

NB 110 may be connected through an Internet Protocol/Asynchronous Transfer Mode (IP/ATM) access network 112 to a radio network controller (RNC) 114 or other a content aware device (CAD) for 3G applications. RNC 114 may be connected through an Internet Protocol/Asynchronous Transfer Mode (IP/ATM) core network 116 to GPRS support node (SGSN) or gateway GPRS support node (GGSN) 118. Node 118 is configured to receive content (e.g., packets) from a content service provider, data center, etc. (e.g., content service provider/data source 224 as illustrated in FIG. 2).

Figure 2:
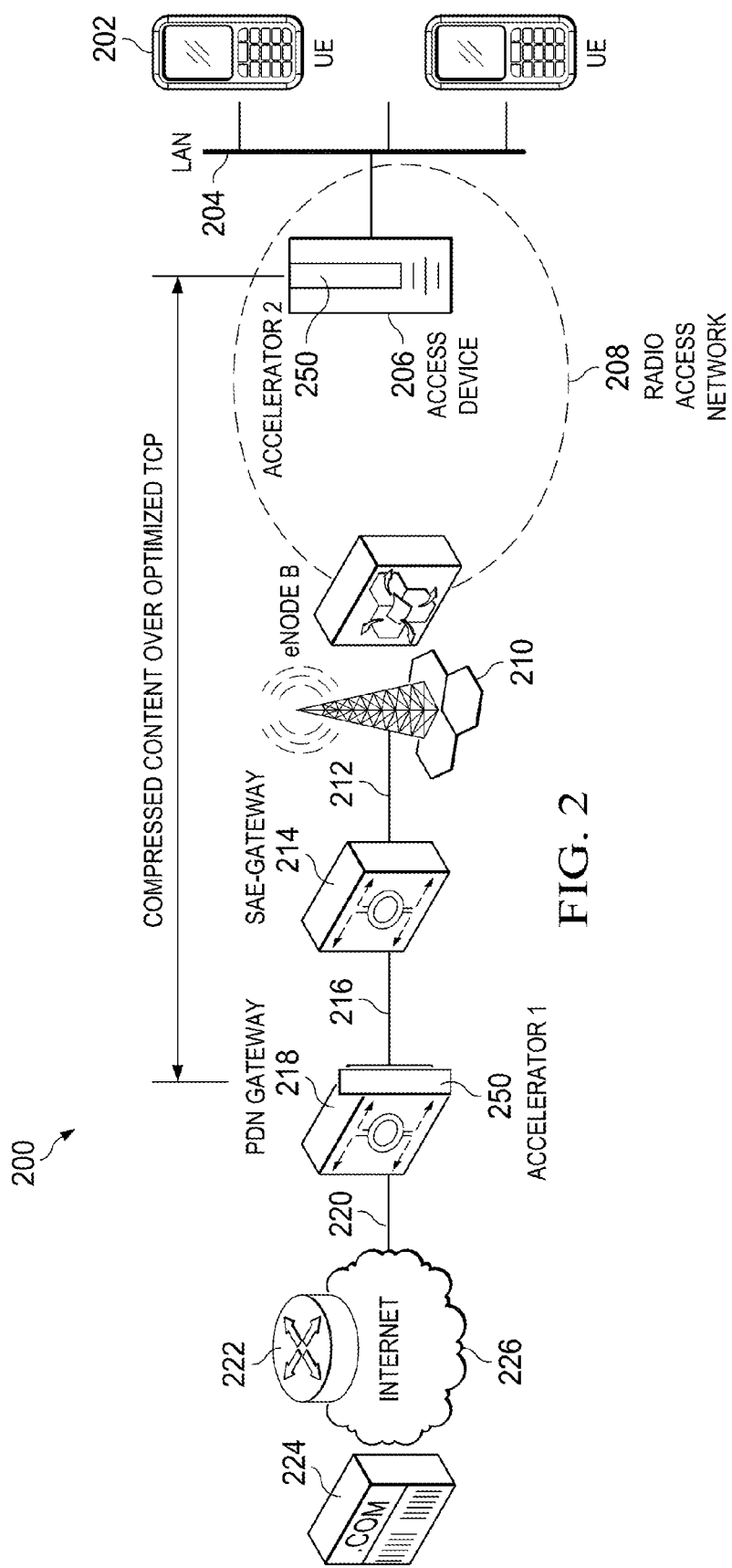
FIG. 2 is a simplified schematic of an embodiment of a long term evolution (LTE) network employing communication devices (e.g., a packet data network (PDN) gateway, an access device, etc.) with an accelerator module in order to improve bandwidth utilization.

FIG. 2 illustrates a high-level view of a wireless communications system 200 such as, for example, a Long Term Evolution (LTE) service for 4G applications. Wireless communications system 200 includes a communications device which is represented in FIG. 2 by UE 202. While the communications device is represented by UE 202 in FIG. 2, the communications device may also be another communications device such as, for example, a network server, networked tablet computer, etc.

UE 202 may be served wirelessly (over link 204) by an access device 206. In an embodiment link 204 is a local area network (LAN). Access device 206 may control communications to and from UE 202. As such, access device 206 controls the network access of UE 202. Access device 206 (e.g., a mobile hot spot, etc.), may be served wirelessly (over link 208) by eNB) 210. In an embodiment, link 208 represents a RAN existing between access device 206 and eNB 210. eNB 210 may also be referred to as a base station, a controller, a communications controller, and so forth. eNB 210 may serve a number of UEs, depending on a configuration of wireless communications system 200, time of day, and so forth.

eNB 210 may be connected through link 212 to a service architecture evolution (SAE) gateway 214. SAE gateway 214 may be connected through link 216 to a packet data network (PDN) gateway 218. PDN gateway 218 is connected through link 220 to router 222, which provides access to a data source or content provider 224 via network 226 (e.g., the Internet, a private network, or combination thereof).

Referring collectively to FIGS. 1 and 2, several of the communications devices, in particular RNC 114, access device 106, PDN Gateway 218, and access device 206, are each equipped with an accelerator module 250. As will be more fully explained below, the accelerator module 250 is configured to improve bandwidth utilization in a cellular wireless communications network and to reduce access latency for the UEs to get request content over the network. In addition, the add-on acceleration module 250 at the client side (e.g., on the access device) may add value to the terminal devices against competing products. Likewise, the add-on acceleration module 250 employed in equipment on the other side of the radio network (e.g., on the RNC 114) may add value to the equipments marketed to service providers.

While one of accelerator modules 250 is illustrated in RNC 114 in FIG. 1, in an embodiment the accelerator module may be found in SGSN/GGSN 118, access network 112, core network 116, or in some other communications device or system disposed to the left of RAN as depicted FIG. 1. In addition, while one of accelerator modules 250 is illustrated in access device 106 in FIG. 1, in an embodiment the accelerator module may be found in the UE, the LAN, or in some other communications device or system disposed to the right of RAN as depicted FIG. 1. In an embodiment, the accelerator module 250 is implemented on the access device 106 instead of on one of the UEs due to the UEs reliance on batteries, which may be drained too quickly during heavy computational tasks performed by the accelerator module 250.

Similar to the above, while one of accelerator modules 250 is illustrated in PDN gateway 218 in FIG. 2, in an embodiment the accelerator module may be found in SAE gateway 214, router 222, or in some other communications device or system disposed to the left of RAN as depicted FIG. 2. In addition, while one of accelerator modules 250 is illustrated in access device 206 in FIG. 2, in an embodiment the accelerator module may be found in the UE, the LAN, or in some other communications device or system disposed to the right of RAN as depicted FIG. 2.

Figure 3:
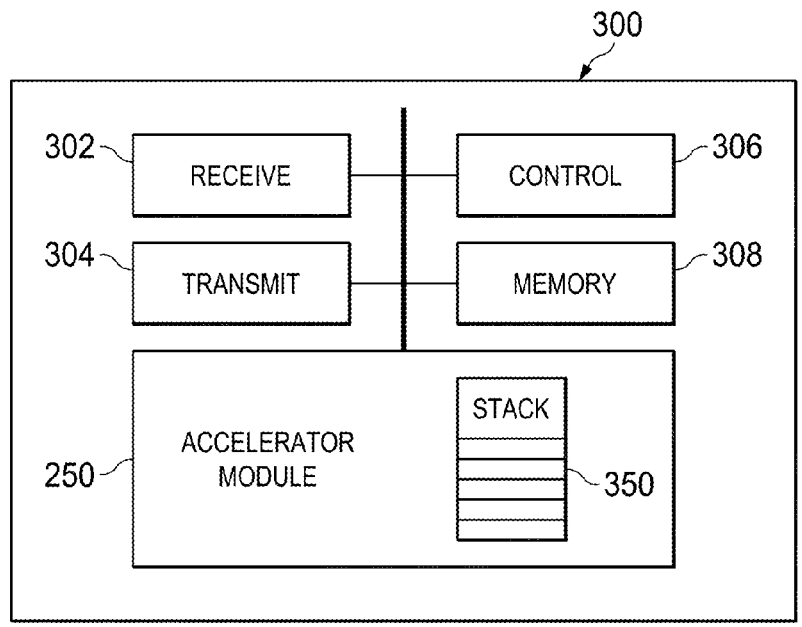
FIG. 3 is a simplified schematic of one of the communications devices having the accelerator module and employed in the UMTS of FIG. 1 or the LTE network of FIG. 2.

Referring now to FIG. 3, a simplified schematic of a communications device 300 (e.g., RNC 114, access device 106, PDN Gateway 218, access device 206, etc.) having one of the accelerator modules 250 is depicted. As shown in FIG. 3, communications device 300 generally includes a receive unit 302 used to receive incoming information, which is generally in the form of IP packets. Communications device 300 may also include a transmit unit 304 used to transmit outgoing information. Receive unit 302 and transmit unit 304 may be wireline and/or wireless units. In general, packets may arrive at communications device 300 through receive unit 302 and may leave through transmit unit 304.

In an embodiment, communications device 300 also includes a control unit 306. Control unit 306 is used to control the operation of communication device 300. For example, depending on the type of communications device 300 being considered, control unit 306 may be used to compute routes based on a routing function, detect faults, serve as anchors for UEs, grant and schedule transmission opportunities to UEs served by control unit 306, process attach requests, participate in handovers, and so forth. Control unit 306 may be implemented using a general purpose or special purpose processor or controller, combinatorial logic, state machines, or a combination thereof.

Communications device 300 also includes a memory 308 used to store configuration information, routing information, UE specific information, scratch memory, buffer space for transmissions, and so forth. Memory 308 may be a combination of read-only memory, random access memory, programmable read-only memory, and so on.

In an embodiment, the accelerator module 250 of the communication device 300 is operatively coupled to one or more of receive unit 302, transmit unit 304, control unit 306, and memory 308. As shown in FIG. 3, accelerator module 250 includes accelerator stack 350 that, when implemented, improves bandwidth utilization in a wireless communications system (e.g., UMTS or LTE network). Accelerator stack 350 may be hardware, firmware, software, or some combination thereof.

Figure 4:
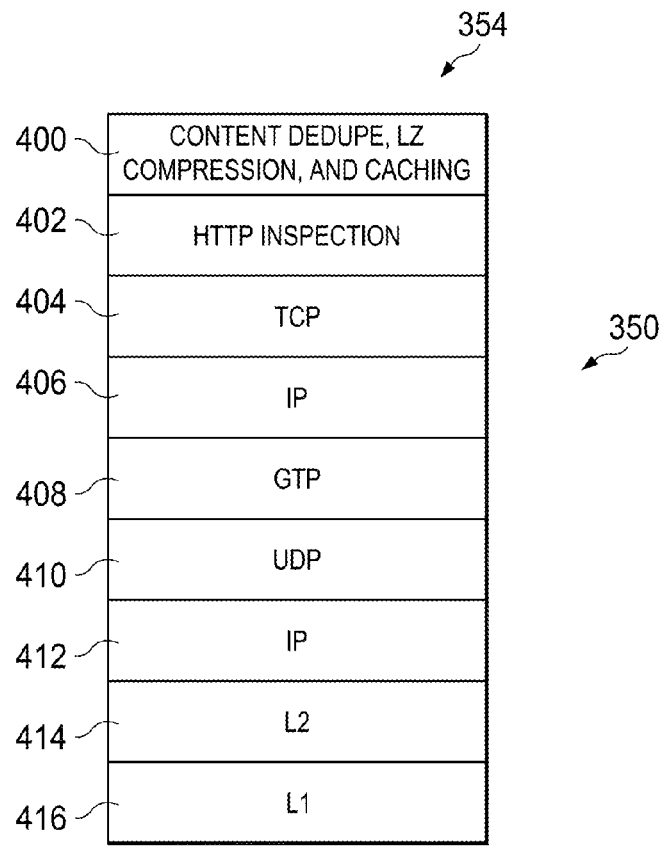
FIG. 4 is a simplified schematic of an embodiment of a software stack employed by the accelerator module of FIG. 3.

Referring now to FIG. 4, a simplified schematic of accelerator stack 350 is illustrated. As will be more fully explained below, accelerator stack 350 is employed to facilitate data or content transfer between RNC 114 and access device 106 in wireless system 100 of FIG. 1 and between PDN gateway 218 and access device 206 in wireless system 200 of FIG. 2. In an embodiment, the stack that access device 106 of FIG. 1 and access device 206 of FIG. 2 have facing UE 102 and UE 202, respectively, is a stack other than stack 350.

Accelerator stack 350 is generally implemented from bottom 352 to top 354 when packets are received by (i.e., on the way in to) a device and implemented from the top 354 to the bottom 352 when packets are being transmitted (i.e., on the way out) of a device. In an embodiment, accelerator stack 350 is generally configured for and compatible with wireless communications.

As shown in FIG. 4, accelerator stack 350 includes a content de-duplication (DEDUPE) layer 400. In an embodiment, DEDUPE layer 400 operates to identify content that is already stored in the cache of a device and, instead of re-transmitting the content through the network, simply transmits a pointer to the previously-stored content. In using the pointer, which is much smaller in size relative to the content, bandwidth can be preserved for other communications. By way of example, UE 102 of FIG. 1 may submit a request for content to access device 106. Access device 106 then passes that request on to NB 110 through the RAN. In turn, NB 110 transmits the request through access network 112 to RNC 114. The RNC 114 forwards the UE request to the content provider. The content provider sends requested content to RNC 114. When the requested content is received by RNC 114, accelerator 250 compares the content with content in its cache and decides that the same content is cached at access device 106. Therefore, instead of retransmitting this content over the network, accelerator 250 on RNC 114 sends a reference pointer to this content in the cache on access device 106. The pointer identifies the location in, for example, memory 308 of access device 106 (or perhaps another device on the right side of RAN in FIG. 1) where the content has been stored. Indeed, the same content is cached at both the RNC 114 and access device 106.

Accelerator stack also includes a hypertext transfer protocol (HTTP) inspection layer 402. HTTP layer 402 performs numerous operations to reduce the number of protocol handshaking messages going through the radio access network (RAN) and therefore reduces the latency for the UE to receive the requested content. In an embodiment HTTP layer 402 performs meta data caching to cache data such as, for example, e-tag, expiration time, "last modification" time, and maximum age. In an embodiment, HTTP layer 402 may also perform 301 redirect caching to cache the permanent redirect responses from servers and authentication caching to cache 401 unauthorized responses from servers. In an embodiment, HTTP layer 402 in the accelerator 250 of access device 106 may also perform object caching to cache objects requested by the first client requesting those objects and object prefetching to cache web resources before they are requested by the real client. In an embodiment, HTTP layer 402 may also perform connection pooling to maintain persistent TCP connections through the RAN. In an embodiment, HTTP layer 402 may also provide hints to DEDUPE layer 400 on content length and header length in order to improve de-duplication results.

In an embodiment, accelerator stack 350 also includes a transmission control protocol (TCP) layer 404. TCP layer 404 controls the amount of data to be transferred and manages data retransmit in event of packet loss. TCP layer 404 operates to adjust data transfer window between accelerator module 250 on RNC 114 of FIG. 1 and accelerator 250 on access device 106 based on acknowledgement streams (or other parameters) received from access device 106. The acknowledgement streams, or ACK streams, may provide an indication of network condition web run time (WRT). For example, the network congestion may be determined through the time it takes ACK packets to arrive and/or the absence of some ACK packets.

In an embodiment, accelerator stack 350 also includes an internet protocol (IP) layer 406, a general packet radio service (GPRS) tunneling protocol (GTP) layer 408, a user data protocol (UDP) layer 410, an additional IP layer 412, and lower level layers L2 414 and L1 416.

IP layer 406 provides and/or handles actual UE and server addresses while GTP layer provides IP-based communications protocols used to carry GPRS within UMTS and LTE networks. UDP layer 410 provides protocols for user data and the additional IP layer 412 provides tunneling protocols. Finally, the lower level layers L2 414 and L1 416 provide a data link to handle the specifics of RAN and a physical link, respectively.

Figure 5:
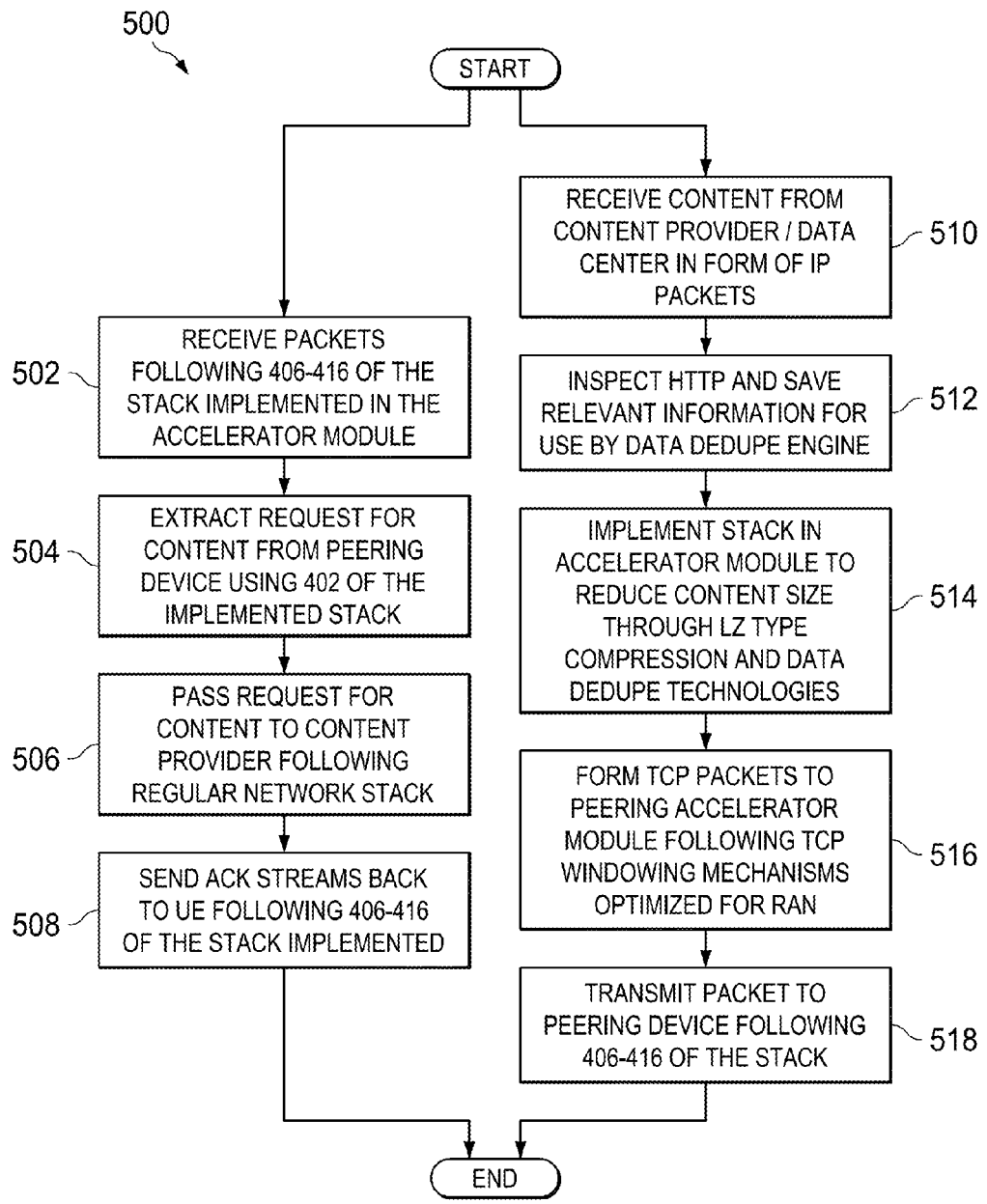
FIG. 5 is a method of transmitting data using the accelerator module of FIG. 3.

Referring now to FIG. 5, a method 500 of transmitting data is illustrated. In block 502, packets are received after layers 406-416 of the stack 350 have been implemented in the accelerator module 250. In block 504, a request for content is from a peering device is extracted using layer 402 of the implemented stack 350. In block 506, the request for content is passed to a content provider following the regular network stack. In block 508, acknowledgement (ACK) streams are sent back to the UE after layers 406-416 of the stack 350 have been implemented.

In block 510, content is received from the content provider in the form of IP packets. In block 512, the HTTP is inspected and relevant information, which may be used by DEDUPE layer 400 (i.e., a de-dupe engine) to improve its performance, is saved. In block 514, the stack 350 in accelerator module 250 on one side of a RAN is implemented in order to compress (i.e., reduce the content size) of the content for transmission over the RAN. In particular, the stack in the accelerator module is implemented to reduce content size through LZ-type compression and data de-dupe technologies. In other embodiments, other types of compression technologies may be used to reduce content size. For example, the compression methods described in "System and Method for Content and Application Acceleration in a Wireless Communications System," U.S. patent application Ser. No. 13/400,527, which is incorporated herein in its entirety by reference, may be employed. In block 516, the packets are formed for a cooperating accelerator module 250 disposed on another side of the RAN. In particular, packets are formed for a peering accelerator module following TCP windowing mechanisms optimized for RAN. In block 518, the packets are transmitted to the peering device following implementation of layers 406-416 of the stack 350. The cooperating accelerator module includes a corresponding stack that, when implemented, is configured to reconstruct the original contents (e.g., decompress the packets) in order to improve bandwidth utilization in a wireless communications system.

Figure 6:
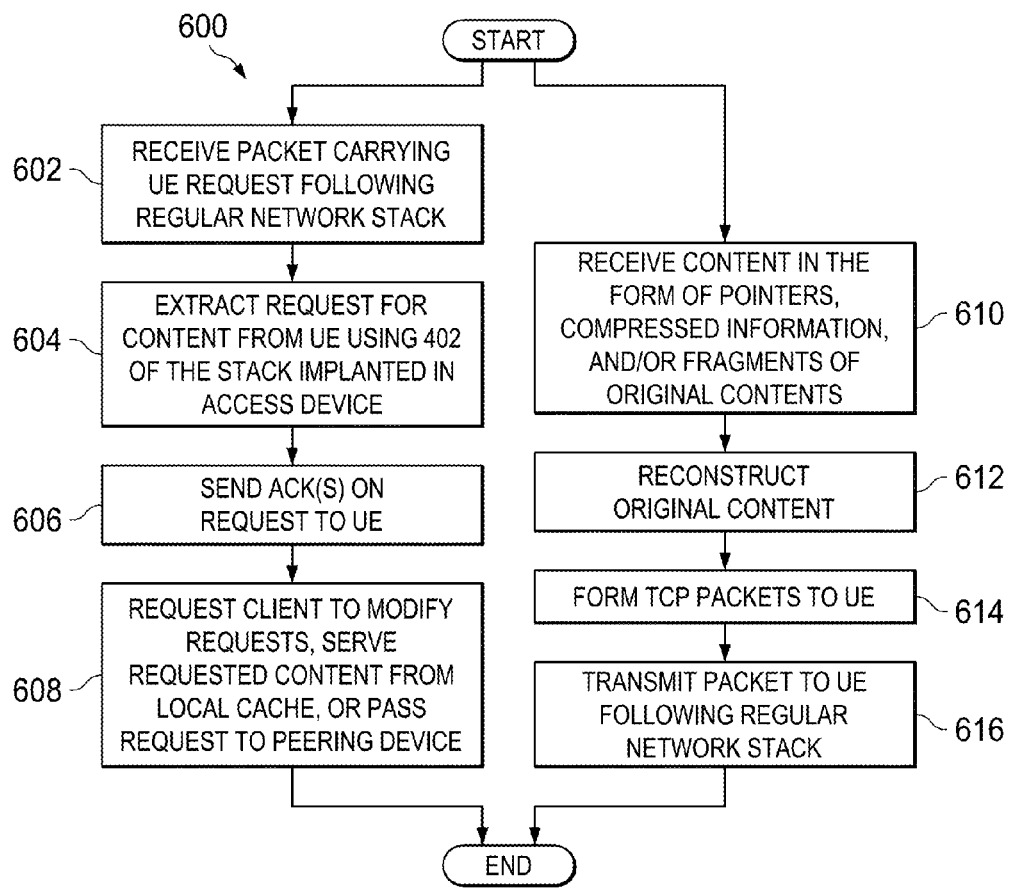
FIG. 6 is a method of receiving data using the accelerator module of FIG. 3.

Referring now to FIG. 6, a method 600 of receiving data is illustrated. In block 602, packets carrying a UE request are received following a regular network stack. In block 604, a request from the UE is extracted using layer 402 of the stack 350 implanted in the access device 206. In block 606, acknowledgement (ACK) streams are sent back to the UE upon request. In block 608, a client is requested to modify requests, serve requested content for a local cache, or pass the request to a peering device.

In block 610, content that has been transmitted from one side of a radio access network are received. In particular, content is received in the form of pointers, compressed information, and/or fragments of original contents. The packets have been compressed (i.e., the content has been reduced) using a stack in accelerator module 250. In block 612, a corresponding stack in a cooperating acceleration module 205 disposed on another side of the RAN is implemented. The stack reconstructs the original content (e.g., decompresses the packets) in order to improve bandwidth utilization in a wireless communications system. In block 614, TCP packets are formed for another communication device (e.g., UE 205 in FIG. 2). Thereafter, in block 616 the packets are transmitted to another communication device following the regular network stack.

Referring now to FIG. 7, an illustration 700 of an embodiment of information flow through a cellular wireless network when communications devices employ the accelerator modules described herein. As shown, the Access Device (e.g., a MiFi access device) having an accelerator module (Accelerator 2) receives a request from UE 1. The Access Device may respond to the request and receive a modified request. The request or modified request is passed to the RNC having an accelerator module (Accelerator 1), to the GGSN, and to the Content Provider/Data Center. The Content Provider/Data Center responds with original content, which is passed back to the RNC. The RNC reduces (e.g., compresses) the original content and passes that reduced content to the Access Device. In an embodiment, the reduction of the original content is a lossless content reduction. The Access Device reconstructs the original content for UE 1. Upon request of UE 2, any cached content is transmitted to the UE 2 by the Access Device.

Although embodiments described hereinabove operate within the specifications of a cellular communication network such as a 3GPP-LTE cellular network, other wireless communication arrangements are contemplated within the broad scope of an embodiment, including WiMAX, GSM, Wi-Fi, and other wireless communication systems.

It is noted that, unless indicated otherwise, functions described herein can be performed in either hardware or software, or some combination thereof, with or without human intervention. In an embodiment, the functions are performed by a processor such as a computer or an electronic data processor in accordance with code such as computer program code, software, and/or integrated circuits that are coded to perform such functions, unless indicated otherwise.

While the disclosure has been made with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for transmitting data, comprising:
receiving packets from a content provider;
sequentially implementing a first stack in a first order in a first accelerator module on a packet data network (PDN) gateway, a radio network controller (RNC), a service architecture evolution (SAE) gateway, a general packet radio service (GPRS) support node (GSN), an Internet Protocol/Asynchronous Transfer Mode (IP/ATM) core network, an IP/ATM access network, or a router, on one side of a radio access network, wherein the first stack is configured to reduce a size of original content carried in the packets, and wherein the first stack is implemented by initiating a content de-duplication, Lempel-Ziv (LZ) compression/decompression and caching layer, or by initiating a hypertext transfer protocol layer, or by initiating a transmission control protocol layer; and
transmitting the packets over the radio access network such that the packets, when received on another side of the radio access network by an access device including a cooperating accelerator module having a corresponding stack configured to be implemented in a second order opposite of the first order, are used to reconstruct the original content.

2. The method of claim 1, further comprising implementing the first stack in the first accelerator module by initiating the content de-duplication, Lempel-Ziv (LZ) compression/decompression, and caching layer.

3. The method of claim 1, further comprising implementing the first stack in the first accelerator module by initiating the hypertext transfer protocol layer.

4. The method of claim 1, further comprising implementing the first stack in the first accelerator module by initiating the transmission control protocol layer.

5. A method for receiving data, comprising:
receiving packets transmitted from one side of a radio access network, the packets having been compressed using a first stack sequentially implemented in a first order in a first accelerator module on a packet data network (PDN) gateway, a radio network controller (RNC), a service architecture evolution (SAE) gateway, a general packet radio service (GPRS) support node (GSN), an Internet Protocol/Asynchronous Transfer Mode (IP/ATM) core network, an IP/ATM access network, or a router;

sequentially implementing a corresponding stack in a second order opposite the first order in a cooperating acceleration module disposed in an access device on another side of the radio access network, the corresponding stack decompressing the packets, wherein the corresponding stack is implemented by initiating a content de-duplication, Lempel-Ziv (LZ) compression/decompression and caching layer, or by initiating a hypertext transfer protocol layer, or by initiating a transmission control protocol layer; and transmitting the packets to another communications device.

6. The method of claim 5, further comprising implementing the corresponding stack in the cooperating accelerator module by initiating the content de-duplication, Lempel-Ziv (LZ) compression/decompression, and caching layer.

7. The method of claim 5, further comprising implementing the corresponding stack in the cooperating accelerator module by initiating the hypertext transfer protocol layer.

8. The method of claim 5, further comprising implementing the corresponding stack in the cooperating accelerator module by initiating the transmission control protocol layer with a congestion control mechanism optimized for the radio access network.

9. A communications device, comprising:
a receiver configured to receive packets from a content provider disposed on one side of a radio access network;
a first accelerator module configured to sequentially implement a first stack in a first order to reduce a size of original content carried in the packets, wherein the stack of the accelerator module includes at least one of a content de-duplication, Lempel-Ziv (LZ) compression/decompression and caching layer, a hypertext transfer protocol (HTTP) layer, and a transmission control protocol (TCP) layer; and
a transmitter configured to transmit the packets to an access device on another side of the radio access network where the packets, when received, are used to reconstruct the original content using a cooperating accelerator module with a corresponding stack configured to be implemented in a second order opposite of the first order, wherein the receiver, the first accelerator module, and the transmitter are disposed in a packet data network (PDN) gateway, a radio network controller (RNC), a service architecture evolution (SAE) gateway, a general packet radio service (GPRS) support node (GSN), an Internet Protocol/Asynchronous Transfer Mode (IP/ATM) core network, an IP/ATM access network, or a router.

10. The communications device of claim 9, wherein the receiver, the first accelerator module, and the transmitter are disposed in the radio network controller.

11. The communications device of claim 9, wherein the receiver, the first accelerator module, and the transmitter are disposed in the general packet radio service (GPRS) support node (GSN).

12. The communications device of claim 9, wherein the receiver, the first accelerator module, and the transmitter are disposed in the service architecture evolution (SAE) gateway.

13. The communications device of claim 9, wherein the receiver, the first accelerator module, and the transmitter are disposed in the packet data network (PDN) gateway.

14. The communications device of claim 9, wherein the stack of the first accelerator module includes the content de-duplication, Lempel-Ziv (LZ) compression/decompression and caching layer.

15. A communications device, comprising:
a receiver configured to receive packets from a network device on one side of a radio access network, the packets carrying reduced size content generated by sequentially implementing a first stack of a first accelerator module in a first order;
a cooperating accelerator module disposed in an access device and configured to sequentially implement a corresponding stack in a second order opposite of the first order to reconstruct original content from the reduced sized content upon receipt of the packets, wherein the corresponding stack is implemented by initiating a content de-duplication, Lempel-Ziv (LZ) compression/decompression and caching layer, or by initiating a hypertext transfer protocol layer, or by initiating a transmission control protocol layer; and
a transmitter configured to transmit the original content to an access device on another side of the radio access network, wherein the receiver, the cooperating accelerator module, and the transmitter are disposed in a packet data network (PDN) gateway, a radio network controller (RNC), a service architecture evolution (SAE) gateway, a general packet radio service (GPRS) support node (GSN), an Internet Protocol/Asynchronous Transfer Mode (IP/ATM) core network, an IP/ATM access network, or a router.

16. The communications device of claim 15, wherein the cooperating accelerator module is configured to serve the original content directly, to serve the original content from a cache, and to instruct a content requestor to reformat a content request.

17. The communications device of claim 15, wherein the communication device is connected to the radio network controller (RNC) on the one side of the radio access network and to the access device on the another side of the radio access network.

18. The communications device of claim 15, wherein the receiver, cooperating accelerator module, and the transmitter are disposed in a local area network (LAN).

19. The communications device of claim 15, wherein the de-duplication is configured to identify the packets that are already stored in a cache of a requesting device.

20. The communications device of claim 15, wherein the cooperating accelerator module includes the content de-duplication, Lempel-Ziv (LZ) compression/decompression, and caching layer.

* * * * *